June 25, 1940.  G. L. MURRAY  2,205,959
APPARATUS FOR CONTROLLING THE OPERATION OF MACHINE
TOOLS USING FIXED OR MOVABLE CUTTERS
Filed Oct. 16, 1936  4 Sheets-Sheet 1

Inventor:
Guy Leslie Murray,
By Potter, Pierce & Scheffler,
Attorneys.

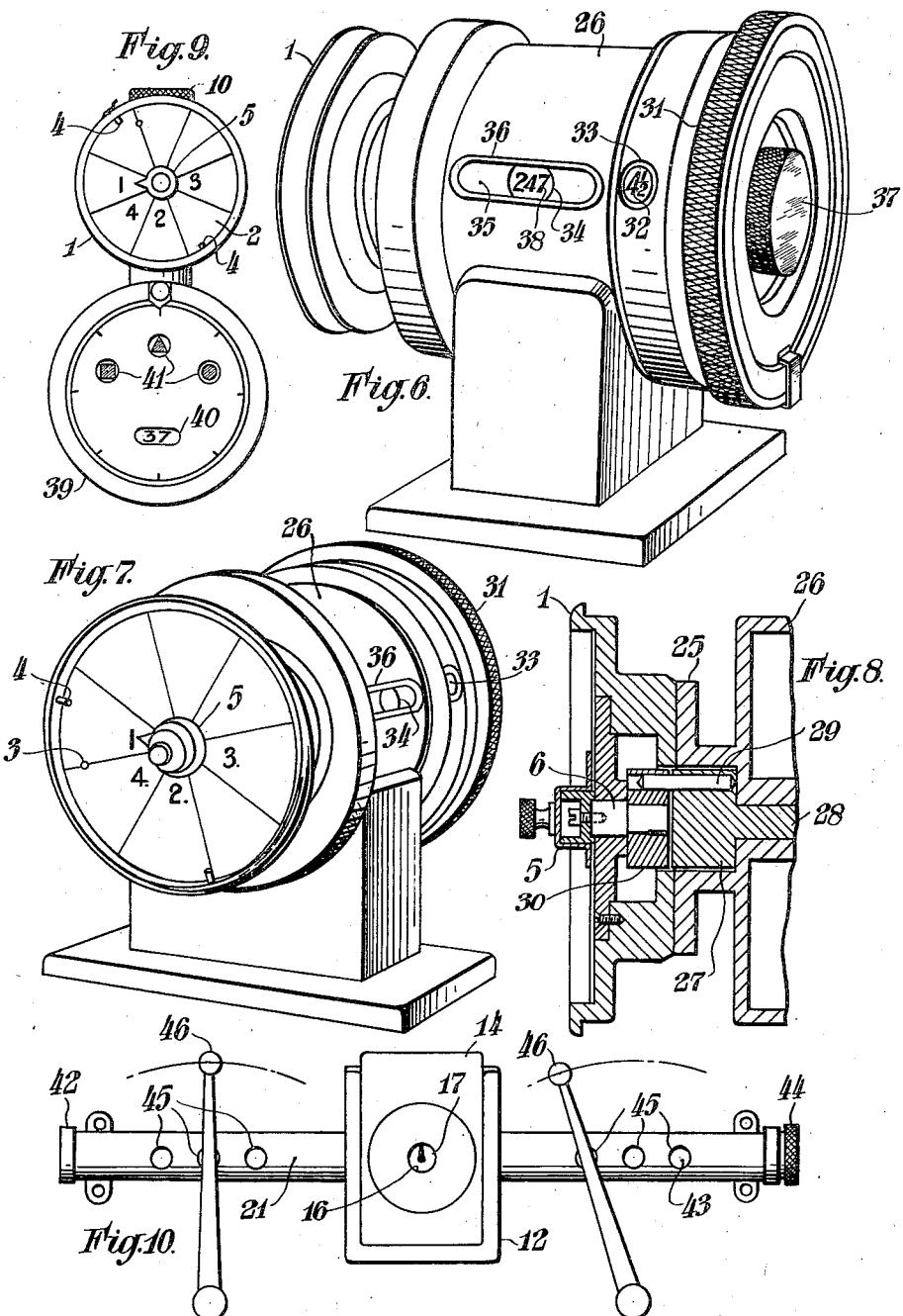

June 25, 1940.  G. L. MURRAY  2,205,959
APPARATUS FOR CONTROLLING THE OPERATION OF MACHINE
TOOLS USING FIXED OR MOVABLE CUTTERS
Filed Oct. 16, 1936  4 Sheets-Sheet 4
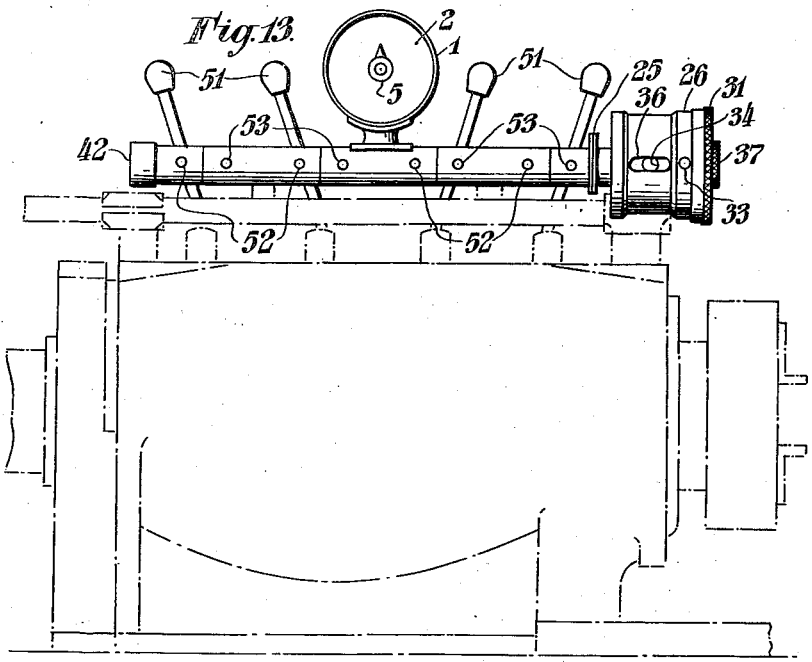
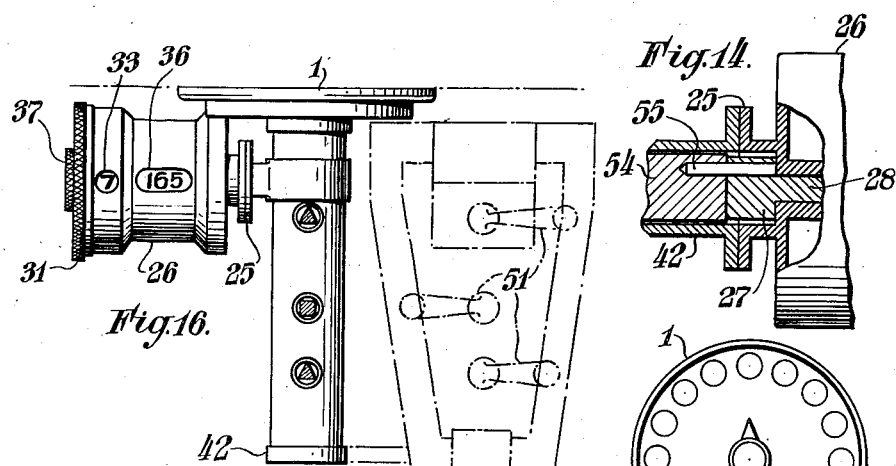
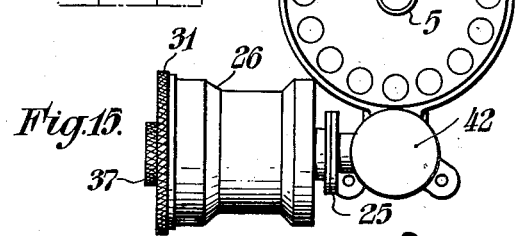

Patented June 25, 1940

2,205,959

UNITED STATES PATENT OFFICE 2,205,959

APPARATUS FOR CONTROLLING THE OPERATION OF MACHINE TOOLS USING FIXED OR MOVABLE CUTTERS

Guy Leslie Murray, Leeds, England, assignor to Murray Colour Controls Limited, London, England Application October 16, 1936, Serial No. 106,000
In Great Britain October 29, 1935

10 Claims. (Cl. 82—34)

This invention relates to apparatus for controlling the operation of machine tools using fixed or movable cutters by displaying indications of speeds, feeds, diameters of work or other information required in the correct operation of a machine tool.

In machine tool construction it is customary to provide the above information on speed and feed instruction plates, and as there is a tendency to introduce an ever increasing number of speeds, feeds or other motions the necessary information becomes more extensive and complicated.

The object of this invention is to avoid the confusion and uncertainty that arises in the interpretation of existing information on such instruction plates by adopting the method of facilitating the control of a machine tool by means of a chart suitably marked to indicate the correct speed or feed at which the machine should operate for the work to be performed.

A further object comprises the method of controlling a machine tool by means of an operation indicator incorporating a chart marked with dimensions or a sequence of different operations.

In this specification the expression "operation indicator" includes apparatus by means of which the operator can readily co-ordinate the information imparted thereto by the mechanical calculator or charts and utilise same to facilitate the setting of control handle positions; the expression "control indicator" includes any device adapted to show characteristic indications indicative of the positions where the control handles of the machine should be placed; the expression "mechanical calculator" includes any device which upon being set to known data shall reveal by the movement of one or more of its component parts, indications of speeds, feeds, diameters of work or other information required in the correct operation of a machine tool.

Referring now to the accompanying drawings in which several embodiments of the invention are shown by way of example only:

Figs. 6 and 7 are perspective views of a mechanical calculator combined with an operation indicator of dial formation;

Fig. 8 is a sectional elevation of the operation indicator showing its coupling to the calculator;

Fig. 9 is a front elevation of a dial type of control indicator combined with a dial type of operation indicator;

Fig. 10 is a front elevation of a tubular control indicator combined with a rectangular type of operation indicator;

Fig. 13 is a front elevation showing a mechanical calculator combined with a control indicator and an operation indicator, mounted in position on a lathe which is shown in chain dotted lines;

Fig. 14 is a part sectional elevation showing the coupling between the calculator and the control indicator;

Figs. 15 and 16 are respectively a front elevation and a plan of a modified combined construction of mechanical calculator, control indicator and operation indicator.

Like parts in the several views are marked with similar reference numerals.

In one way of carrying out the invention, the operation charts for facilitating the operation of a machine tool are first compiled in any suitable manner and subsequently located in an operation indicator on a machine tool. The purpose of the operation indicator is to co-ordinate the information imparted to it, which information may be imparted by a mechanical calculator; it may be used either in combination therewith for the compiling operation or separately therefrom when used for indication purposes on a machine tool and aims generally at controlling a machine tool by means of an operation chart arranged for rapid attachment to the operation indicator by means of which a person is enabled quickly to set the control handles to their proper positions to perform a sequence of operations set out on the chart. The operation indicator may be readily combined with a control indicator so that characteristic indications can be displayed for showing the positions where the control handles of a machine tool should be placed.

Figure 1:
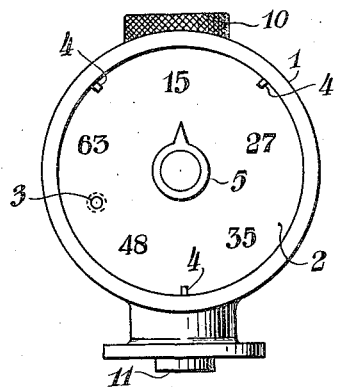
Figs. 1 and 2 are front and sectional elevations of a dial type of operation indicator.
Figure 2:
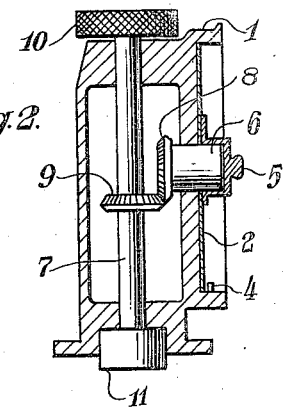

In Figs. 1 and 2 the operation indicator is shown comprising a dial 1 adapted to have a circular chart or card 2 affixed thereto in a readily detachable manner and also in a definite or set position in relation to the dial; for example, a perforation in the chart 2 registers with a dowel pin 3 on the dial so as to ensure that the chart will always be replaced in the same position. The chart is retained by means of pins 4 projecting laterally from the rim of the dial. To afford rapid removal of the chart the dowel pin 3 may be spring controlled and project rearwardly from the dial to allow manipulation so that its forward end will press the chart away from the dial 1.

In the centre of the dial 1 is a pointer 5 definitely located on a spindle 6 which is connected to vertical spindle 7 by means of the bevel wheels 8, 9. The spindle 7 may be rotated by the knurled knob 10 and is also furnished with a coupling 11 by means of which the indicator may be connected to a control indicator or mechanical calculator.

Figure 5:
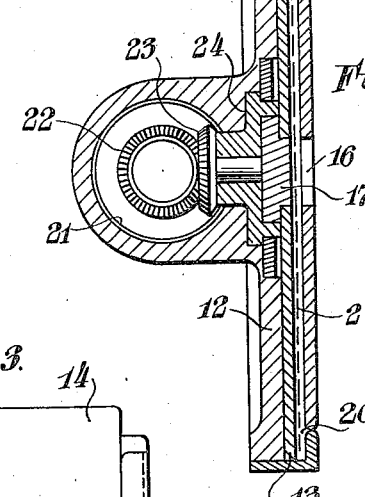
Fig. 5 is a vertical sectional elevation of the modified operation indicator drawn to a larger scale than Figs. 3 and 4.
Figure 3:
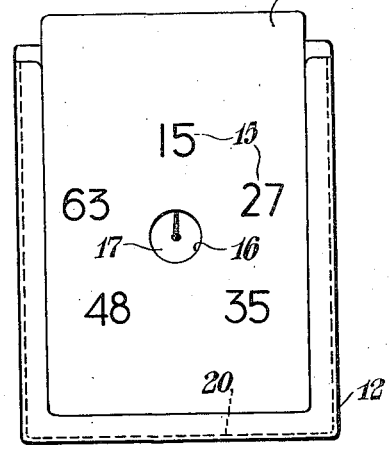
Figs. 3 and 4 show front elevations of a modified type of operation indicator of rectangular formation and furnished with a hinged front plate which is shown raised in Fig. 4.
Figure 4:
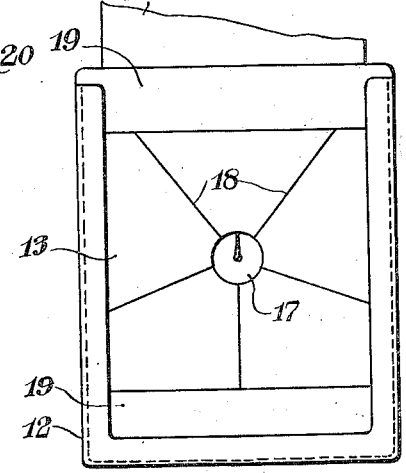

In Figs. 3 to 5 a modified type of operation indicator 12 is shown including a back plate 13 which is normally covered by a hinged front plate 14. The front plate 14 is marked with spindle speed indications 15 and provided with a central opening 16 through which a rotatable pointer disc 17 may be viewed. The back plate 13 is furnished with division lines 18 to provide spaces for the insertion of any desired indication and/or working requirement or data. Further spaces 19, are provided for any additional instructions or other matter. The surface of the back plate 13 may be adapted to allow the various indications or other markings to be marked thereon by means of chalk or other marking medium and afterwards wiped clean and such plate forms a fixed chart.

Space is left between the front and back plates for the insertion of a chart 2 which is apertured to allow the pointer disc 17 to be visible through it and is retained in position by the groove 20 provided for receiving the edges of a chart. With this operation indicator three different means are provided for operation purposes; with the front plate 14 down the disc 17 may be set to any given speed indication 15, if the front plate is raised any desired markings may be applied to the back plate 13 and subsequently employed during the working of a machine tool, or a chart 2 may be placed in the operation indicator 12.

The operation indicator is shown fixed to the casing 21 of a control indicator (Fig. 5) with a bevel wheel 22 in mesh with a bevel wheel 23 formed on the carrier element 24 for the pointer disc 17. It will be understood the carrier element may be connected to part of a mechanical calculator if desired.

Whilst both the above operation indicators include only pointer means, printing means, such as an adjustable rubber stamp, may be carried by a pointer so that upon the latter being set to a given position, the stamp may be caused to impress a marking on a chart.

In Figs. 6 to 8 a circular type of operation indicator 1 is shown secured to a flange 25 of a mechanical calculator 26 of the type shown in British Patent 458,858 and its pointer 5 is connected to the enlargement 27 of the central spindle 28 through the medium of a driving pin 29 located in the enlargement and the collar 30 secured on the spindle 6.

In operation let it be assumed that it is desired to prepare an operation chart 2 for use in connection with the machining of a piece of work involving a sequence of operations, each operation necessitating a different setting of the machine, e. g., different spindle speeds.

A blank chart 2 is first attached to the dial of the operation indicator and the perforation in the chart made to register with the dowel pin 3. In order to attach the chart 2, the pointer 5 is removed from its spindle 6, the chart slipped over same and the pointer replaced. When in position the pointer 5 holds the centre of the chart 2 in position; the pointer 5 may be held on to its spindle 6 by an easy press fit, with or without the aid of spring or other retaining devices.

The mechanical calculator is then operated and set to the given requirements of the first operation to be performed on the work. For example, the knurled ring 31 is rotated until a given diameter of work 32 appears in the window 33, and a window 34 in the shutter 35 is registered with the window 36 in the casing of the calculator 26, the knob 37 being finally rotated until the desired cutting speed 38 appears in the window 36. As a result of setting the mechanical calculator 26 in this way the pointer 5 of the operation indicator 1 is moved (by virtue of their interconnection as above described) to a particular position on the chart 2 which in reality denotes the correct speed of the machine spindle. This position on the chart is then marked by putting the operation serial number 1 (and also if desired with the speed of the machine spindle in revs. per minute).

The mechanical caluculator 26 is then set to the requirements for the second operation, when the pointer 5 will be moved to another position on the chart 2 denoting the correct spindle speed for that operation. This position is then marked with the operation serial number 2 (and also if desired with the speed of the machine spindle in revs. per minute).

The mechanical calculator 26 is thus set in turn to the requirements of each of the remaining operations and each position on the chart 2 is accorded the serial number of the appropriate operation. Alternatively the actual size of the work may be marked on the chart instead of the serial numbers.

The chart 2 may have the spindle speeds of the machine printed thereon, or again the dial may extend beyond the chart and carry the spindle speed figures on such extended portion in such a way as these are not obscured when the chart is placed in position.

It will readily be understood a rectangular operation indicator 12 may be combined with a mechanical calculator 26 in a similar manner to that described for the indicator 1.

The chart 2 may be made of any convenient shape, such as, cylindrical, circular, rectangular or other desired form, and of any suitable material. For example, the chart may be made of metal, paper, Celluloid, or paper encased in Celluloid, the material known under the registered trade-mark "Bakelite" or the like, also of any material having a surface suitable for readily marking with pencil, chalk or ink, which can be wiped off or erased as and when required.

The chart 2 may also have printed on either side thereof explanatory data as to the several operations and/or a replica of the work to which it relates. Further, characteristic markings such as symbols may be marked on the card in place of, or in addition to, the serial numbers or diameter indications.

It is to be understood that the apparatus above described and the method of preparing the chart 2 may be employed quite independently of the machine tool; for example, a combined mechanical calculator 26 and operation indicator 1 or 12 may be kept and used in a different department of the works from where the machine tool is located, as for example, the rate fixing or production departments.

Alternatively the mechanical calculator 26 and operation indicator 1 or 12 may be fixed on or adjacent to the machine tool itself.

The manner of using the chart 2 will now be described with reference to Figure 9.

The operation indicator 1 is combined with a control indicator 39 in such a way that the pointer spindle (not shown) of the operation indicator 1 is operatively coupled (through a coupling similar to that marked 11 in Figs. 1 and 2) to the mechanism of the control indicator 39. The latter is adapted to display through windows 40, 41, speed indications and characteristic indications in the form of symbols (letters, numerals, signs, devices, markings or combinations thereof may also be employed) for the purpose of conveying quickly and readily to the mind of the operator where to set the control handles. Thus as the pointer 5 of the operation indicator 1 is moved, the control indicator 39 will display different indications.

The operation chart 2 is now fixed in position and the pointer 5 turned by means of the knob 10 to "operation No. 1" whereupon the control indicator 39 will display indications showing the positions to which the control handles should be set to give the correct spindle speed for performing the first operation on the work.

The operator sets the handles of the machine accordingly and proceeds with the first operation. When completed he turns the pointer 5 to "operation No. 2" and so on, or if desired he may "preselect" the indications for the position of the handles for operation No. 2, while the finishing cut for operation No. 1 is still in progress.

In this way the operator need waste no time in working out the settings of the machine and this will be particularly so where the machine in question is not employed continuously on one particular job and irregular intervals occur before the operator is again called upon to do the same job.

In practice each job would be allotted its own operation chart, so that the operator can at once set the machine correctly although a considerable period may have elapsed since he last worked on the particular job and he is relieved of the necessity of working out again the correct spindle speeds for each operation involved.

It will be appreciated that the operation indicator may be combined with other types of control indicators capable of being set by the operation indicator. Also operation may be effected by means on the control indicator and/or the operation indicator.

In Fig. 10 is shown a construction which combines a rectangular type of operation indicator 12 with a tubular control indicator 42. The operation indicator is clamped to the casing 21 of the indicator 42 with its pointer disc 17 connected to the indication tube 43 of the indicator by the aforesaid bevel wheels 22, 23. Rotation of the knurled knob 44 causes symbols or other characteristic indications to be visible in the windows 45 and the pointer disc 17 to turn to the desired speed indication, operation number or other indication, displayed on the operation indicator 12 or chart carried thereby. After this operation the control handles 46 can be set to the characteristic indications visible.

Figure 11:
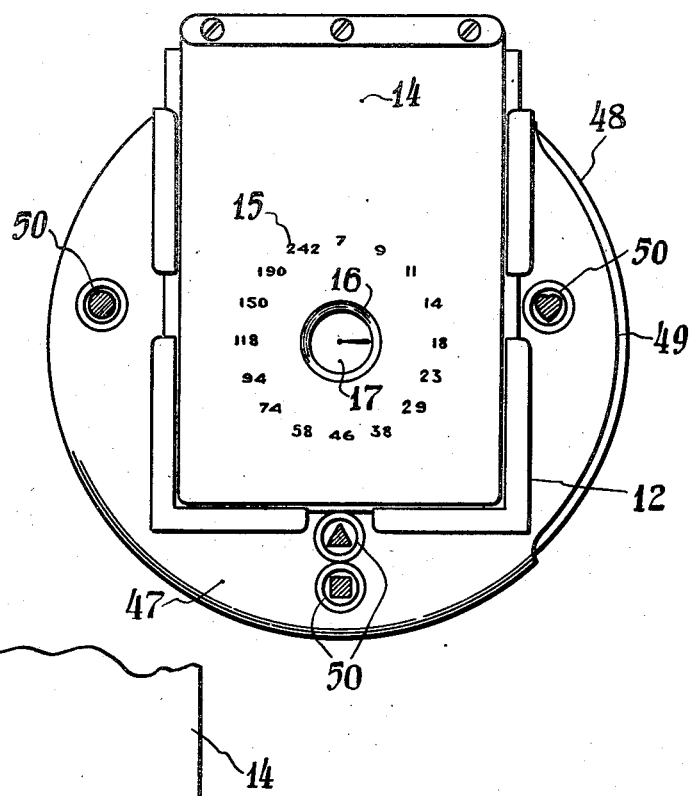
Figs. 11 and 12 show front elevations of a modified dial type of control indicator combined with a rectangular type of operation indicator which is shown raised in Fig. 12.
Figure 12:
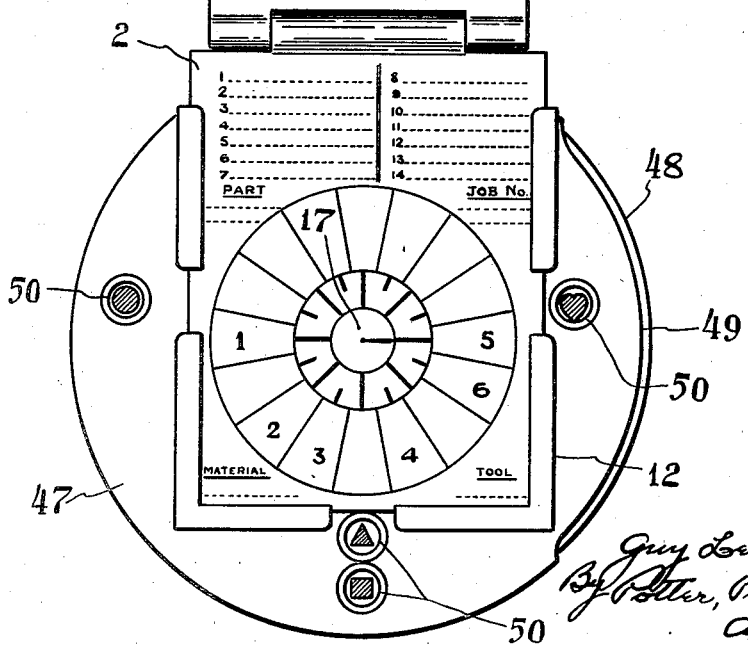

Figs. 11 and 12 show a rectangular type of operation indicator 12 combined with a dial type of control indicator 47. The operation indicator is formed on or fixed to the front plate of the control indicator 47 with its pointer disc 17 secured to the indication plate 48. The edge of the plate 48 is knurled and protrudes for manipulation purposes beyond the recessed portion 49 of the edge of the indicator 47. Rotation of the plate 48 causes symbols to be visible in the windows 50 and the pointer disc 17 (visible through the central opening 16) to turn to the desired speed indication 15 on the front plate 14 when the later is down. When the front plate 14 is raised to display an operation chart 2, as shown in Fig. 12, the pointer disc 17, visible through the chart, is turned to a desired operation number. After either of the above operations the control handles of the machine tool can be set to similar characteristic indications to those visible in the windows 50.

If desired the mechanical calculator, control indicator and operation indicator can all be mounted on the machine and operatively coupled together in the manner shown in Figs. 13 to 16. In this case when the operator is about to tackle a new job for which no operation chart 2 has yet been compiled, he places a blank chart on the dial of the operation indicator 1 and, by means of the calculator 26 and known working requirements, ascertains the correct spindle speed and settings for the first operation. He marks the chart 2 accordingly, sets the control handles 51 to the positions denoted by the indications displayed in the windows 52, 53 of the control indicator 42 and completes operation No. 1. The process is then repeated with the subsequent operations so that he builds up the operation chart 2 as he proceeds.

Having completed the machining of the first article, he can then use the operation chart for all repetitions of that job. The charts can subsequently be filed away for future reference, thereby saving considerable time when setting the machine for a similar job on future occasions.

In Figs. 13 and 14 a control indicator 42 is secured to the flange 25 of the calculator 26 with its indication spindle 54 connected to the enlargement 27 by means of a driving pin 55 and an operation indicator 1 is mounted on the control indicator intermediate its ends.

In Figs. 15 and 16 a control indicator is secured to the flange 25 of the calculator at right angles to the latter and is connected to the lower end of the operation indicator 1 so as to project forwardly at right angles thereto.

In a machine shop employing more than one machine of a type to which this invention is applied, a combined mechanical calculator and operation indicator could be fitted to only one machine upon which the operation charts 2 could be marked up; each other machine then need only be fitted with an operation indicator and control indicator.

It will also be appreciated that the invention is equally applicable to new and/or existing machine tools and where such machines are already equipped with what is known to the machine tool industry as "single lever" or "dial control" for speeds and feeds, an operation indicator, with or without a mechanical calculator, and/or a control indicator, can be added or incorporated to such existing mechanisms.

It is to be understood that there may be used in conjunction with the operation indicator above described any of the control indicators described in United States patent application Serial No.

5,286 filed February 6, 1935, now Patent No. 2,069,921.

What I claim is:

1. An operation indicator for use with a machine tool having one or more handles for controlling the operation of the machine, said indicator being adapted to facilitate in obtaining the correct settings of the machine control handles to perform a sequence of different operations, indicia on the said operation indicator appertaining to the different operations, a pointer on the indicator movable relatively to said indicia, said pointer being coupled to mechanism for indicating or determining the positions of the machine control handles, said pointer when set in turn to the different indicia successively indicating or determining the position of the machine control handles.

2. An operation indicator for use with a machine tool having one or more handles for controlling the operation of the machine, said indicator having a part shaped to receive a chart marked with indications, a pointer movable relatively to the chart, means actuated by the relative movement between the pointer and the chart for indicating or determining the correct positions of the machine control handles, manipulation of the operation indicator causing indications to be displayed on the said means indicative of appropriate positions to which the machine control handles should be set for each operation.

3. The invention as claimed in claim 2, wherein the charts are compiled on an operation indicator associated with a mechanical calculator, said charts being marked with indications required for the correct operation of a machine tool and subsequently serving to facilitate the operation of the control handles of the machine tool.

4. The invention as claimed in claim 1, wherein the operation indicator is combined with a control indicator furnished with characteristic indications indicative of the positions the control handles of the machine tool should occupy, manipulation of the operation indicator operating the control indicator so that the correct characteristic indications appear.

5. An operation indicator for use with a machine tool, said indicator having a movable front plate carrying speed indications, said plate being apertured, a rotatable pointer movable relative to said indications and visible through the aperture of said plate, said plate when displaced disclosing a chart carrying sequence-indicating symbols to which the pointer may also be moved.

6. The invention as claimed in claim 5, wherein a space is provided between the front plate and rear surface for the insertion of a detachable chart.

7. In apparatus for facilitating the setting of a machine tool to perform a predetermined sequence of different operations, the combination with a mechanical calculator having a plurality of indicia-bearing members, and means for adjusting said members to different relationships in accordance with different working requirements of the machine tool, of an operation indicator comprising a support for a removable chart, a pointer movable with respect to a chart carried by said support, a mechanical coupling between said pointer and said mechanical calculator, and a chart on said support, said chart bearing sequence indications with which said pointer is to be alined.

8. In apparatus for facilitating the setting of a machine tool to perform a predetermined sequence of different operations, an operation indicator for use with a mechanical calculator having a plurality of indicia-bearing members and a shaft rotatable to adjust said members to indicate different settings for the machine tool; said operation indicator including a casing having a dial surface, a shaft rotatable on said casing at the axis of said dial surface, a pointer and means for securing the same to said shaft in predetermined angular position, a circular chart having a central opening for fitting over said shaft, and means for securing said chart in predetermined angular position on said casing at said dial surface.

9. The invention as claimed in claim 8, wherein said casing is secured to the mechanical calculator, and the rotatable shaft of said operation indicator is mechanically connected to the shaft of said mechanical calculator.

10. In apparatus for facilitating the setting of a machine tool for a sequence of different operations, the combination with a mechanical calculator including a plurality of relatively adjustable members that bear indicia indicative of different working conditions, a control indicator adjustable by said mechanical calculator and including indicia indicative of the setting to be made at the machine tool, of an operation indicator comprising a support for carrying indicia significant of the several different operations to be performed, a pointer carried by said support for movement into line with the operations indicia, and means mechanically coupling said pointer to an adjustable member of said mechanical calculator.

GUY LESLIE MURRAY.